Patented July 6, 1948

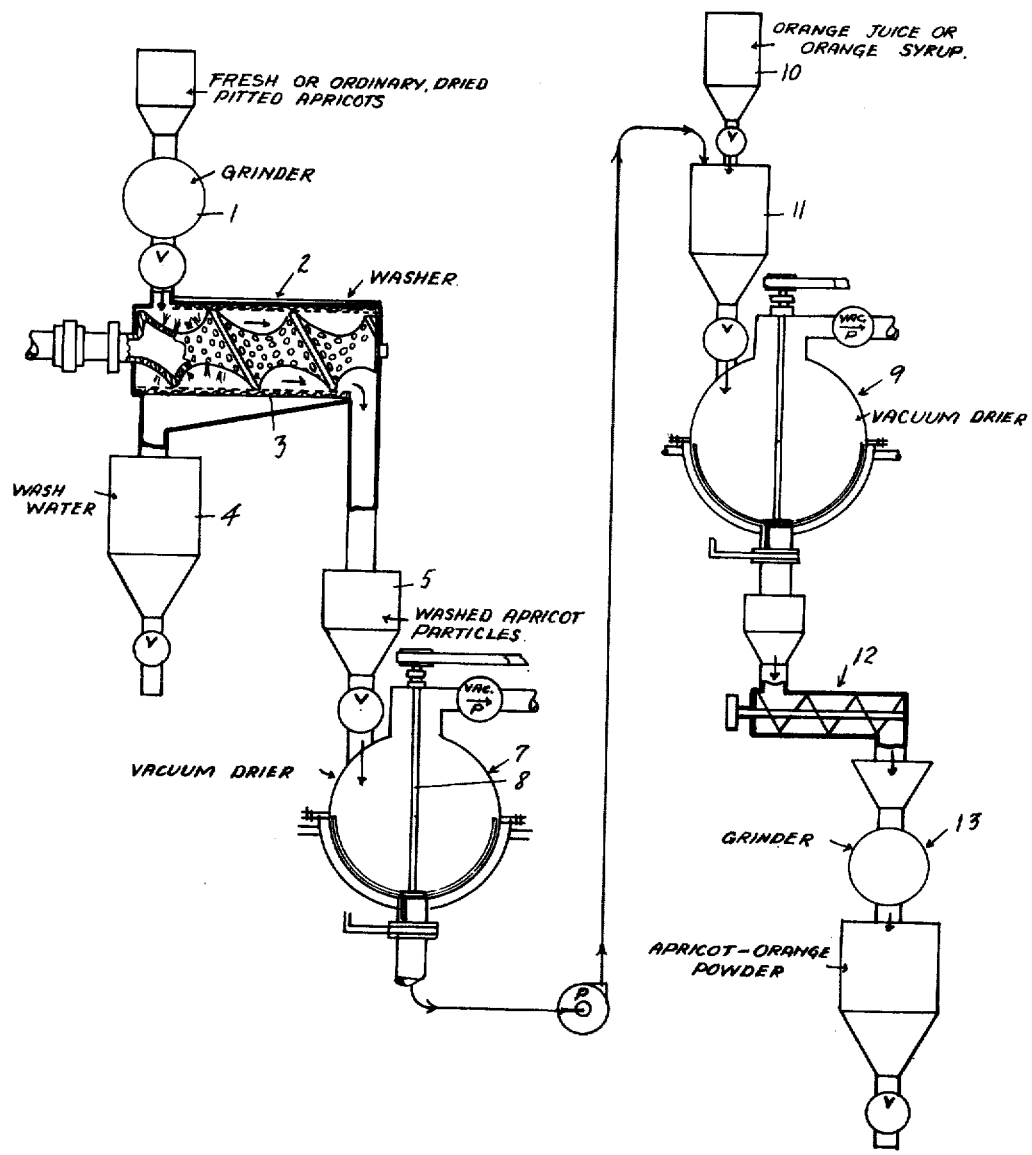

2,444,579

UNITED STATES PATENT OFFICE 2,444,579

FRUIT PROCESS

Kitchener K. Newsom, San Francisco, Calif.

Application December 28, 1943, Serial No. 515,912

3 Claims. (Cl. 99—204)

This invention relates to a process for dehydrating fruit or the like, and to the product of such process.

One of the objects of the invention is an improved process for producing a dry fruit product adapted to be packed, handled and poured like granulated sugar, powder or flour, and in which product the normal vitamins of the original fruit before processing thereof is retained. Also the fruit product will not become gummy when exposed to the atmosphere as occurs in conventionally dried products and it is more resistant to infestation than in conventionally dried fruit products.

Another object of the invention is the production of an apricot powder or the like, from conventionally dried apricots or from fresh ripe apricots, that will not become gummy when exposed to the atmosphere, and in which powder the carotene or pro-vitamin A of such dried apricots or fresh ripe apricots is concentrated and retained.

Another object of the invention is the production of a fruit powder having the desired flavor of orange powder, but which flavor has not heretofore been attainable by dehydrating oranges, and which powder is stable as to flavor and is more stable than strictly orange products as to the vitamin C content of fresh orange juice. The powder also is very rich in carotene and when it is mixed with water produces a drink having the desired orange flavor as well as the carotene and vitamin C values. The appearance of the powder is also that of orange powder although the main insolubles are not from oranges.

Insofar as the production of orange powder is concerned, the efforts heretofore made to accomplish this result have, insofar as I am aware, been abandoned for several reasons, one of which is the apparent impossibility of retaining the desired orange flavor, and another being the difficulty of retaining the vitamin C of the fresh fruit. Also the orange pulp is objectionable, being devoid of any desirable characteristics, and ordinary dehydration of oranges involves the retention of this pulp which in itself imparts an undesirable flavor to the product.

By my process the sugars and vitamin C are fixed in a binder that comprises dehydrated apricots. The special dehydration of the apricots by my process as hereinafter described results in a product that readily acts as a binder for orange juice or a concentrate thereof, and upon mixing said juice or concentrate with the apricot product and then drying the resultant mixture until its moisture content is below about 6% thereof by weight (preferably about 2%), and grinding the dried mixture, a powder is produced that has all of the desired flavor of orange juice or seasoning upon mixing the powder with water or using it as a seasoning. This powder has the additional feature of being very rich in carotene as well as having substantially the vitamin C that is in fresh orange juice.

The process herein described is also adapted for producing a fruit powder that may carry other vitamins than those present in apricots and oranges.

Other objects and advantages will appear in the drawings and description.

The single figure diagrammatically illustrates a system that is adapted to carry out the process.

In detail, either fresh or conventionally dried pitted apricots may be reduced to relatively small pieces in a grinder 1, after which the ground material passes through a washer 2 in which it is thoroughly washed in water of a temperature of about 85° F. (about 30° C.), although the temperature may vary from about 80° F. to about 90° F. (about 27° C. to about 32° C.). Each of the particles of the ground apricots should be washed with the water and ordinarily from about one to four minutes washing is sufficient, the time being to a great degree dependent upon the facility with which the particles are washed and the temperature of the water. A faster washing is ordinarily possible where the temperature is 85° F. than where it is 80° F., and if a hollow screw with openings in the blades and shaft is used as is indicated in my co-pending applications Serial No. 438,687, now abandoned, filed April 13, 1942, and Serial No. 510,122, now Patent No. 2,425,117 filed November 13, 1943, the particles can be washed faster than where merely an ordinary flow of water is maintained through a tank through which the material is moved.

The wash water in washer 2 is preferably constantly drained off through a screen and filter 3 to a tank 4, while the solid material that is thoroughly washed is passed into a receiving tank 5 which may merely constitute a holding tank.

The material in tank 5 may carry considerable moisture which may be between about 50% to 70% by weight thereof, some being surface moisture, some being water absorbed in the washer, particularly where conventionally dried apricots are used, and some being in the fruit particles themselves.

This material in tank 5 is drawn into a vacuum drier 7, wherein it is heated to about 135° F. (about 58° C.) at a vacuum of say, about 26 inches of mercury. Here there may be some variation in temperature, but the temperature of the material in the drier should not exceed 158° F. or 70° C. The heating may be done in any suitable manner. The conventional vacuum pans have jackets for steam or water and such pans are highly satisfactory, but it is very important that the material be agitated or stirred during drying and that there are substantially no "dead" areas or places, particularly over the discharge opening in the bottom of the pan where such vacuum pan is used. A power driven shaft 8 carrying blades that extend into the material to the bottom of the pan and that just clear the sides of the pan during revolution thereof are satisfactory for agitation of the material.

After sufficient moisture has been evaporated from the material in drier 7, the said material may be moved directly into a second drier 9 that is identical with drier 7 in every respect, and in which the material is stirred and mixed and agitated by any suitable means as described for drier 7.

At substantially the same time the material from the drier 7 is moved into drier 9, I add thereto the desired amount of freshly expressed orange juice or concentrate thereof from a source of supply, such as a tank 10. This juice may be directly drawn into drier 9, or the material from drier 7 may be pumped into a receiver 11 and the juice added to the material in the receiver after which the juice and the material are together drawn into drier 9. These variations are optional, inasmuch as the resultant product is much the same, and the stirring or agitation of the material in drier 9 during drying will cause a mixing of the juice with the apricot material.

The amount of juice or concentrate may vary in the ratios of apricot material to juice of say, from about 1 to 4 to about 1 to 1. Ordinarily a ratio of about 1 to 2 of material to juice is found satisfactory.

In the vacuum pan or drier 9 the mix of apricots and orange juice or orange syrup if the former is concentrated, is dried to the point where the moisture content is preferably less than 6% by weight of mix, or about 2%. The same temperature is held as in the case of drier 7, and constant agitation and mixing is necessary to insure a uniform dryness and to facilitate the drying and the satisfactory removal of the finished product from the drier.

After the drying of the mixture in drier 9 is finished, the dry material may be conducted by any suitable conveyor 12 to a grinder 13 for grinding to powder form. From grinder 13 the powder may be packaged directly or stored, as desired.

In using the term "powder" I intend it to mean a product having the characteristic of being either granular or flour-like in its consistency.

The sugars in the apricot material and in the orange juice appear to combine or unite, the apricot material functioning as a binder for the sugars and vitamin C of the orange juice. Also there is a very uniform distribution of vitamin C and carotene and the sugars of both the apricot material and orange juice in the final powder, and which powder will not become gummy when exposed to the atmosphere, but has the characteristics of ordinary granulated cane or beet sugar.

It is pertinent to note that the desired characteristics in the final product are dependent upon the steps in the process that precede the final drying operation. Unless the steps of the process, substantially as described, are followed, it would be impossible to get the product out of the final drier, let alone accomplishing a uniform mixing of orange juice therewith in the mixer. In fact, the same obstacle to handling the material would occur to a great extent in the first drier.

This invention is not to be considered as restrictive to orange juice as the material added at the point between the two driers, since other seasoning, flavorings, or food material may be added at this point, such as various extracts, fruit juices, etc. However, the problem of producing an orange product as specifically described herein involves problems out of the ordinary and which have long been an obstacle in the industry.

Having described the invention, I claim:

1. The process of producing a non-gumming fruit powder as described that comprises the steps, reducing pitted apricots to relatively small pieces, washing said pieces in water of from about 80° F. to about 90° F., draining the surplus water from said washed pieces, partially drying the drained pieces in vacuo to a moisture content appreciably above 6% thereof by weight while constantly agitating the said pieces, mixing a liquid containing vitamins and flavoring with said partially dried pieces, again drying the pieces carrying such vitamins and flavoring in vacuo and while constantly agitating said pieces until the moisture content of the pieces is below about 6% thereof by weight, the said liquid being orange juice containing substantially the natural vitamin C of the fresh juice.

2. The process of producing a non-gumming fruit powder of the character described that comprises the steps of, reducing pitted apricots to relatively small pieces as by grinding, washing said pieces in water of from about 80° F. to about 90° F., draining the surplus water from said washed pieces, partially drying the drained pieces in vacuo while heating said pieces during said drying to a temperature exceeding normal atmospheric temperature and not exceeding about 160° F. and constantly agitating said pieces during said partial drying thereof, thoroughly mixing orange juice containing substantially the vitamin C content of the oranges with said partially dried pieces, again drying the pieces carrying said juice and vitamin C in vacuo and at a temperature above normal atmospheric temperature and not exceeding about 160° F. until the moisture content of the pieces is less than 6% thereof by weight, then reducing the said pieces to powder.

3. The process of producing a non-gumming fruit powder of the character described that comprises the steps of, reducing pitted apricots to relatively small pieces as by grinding, washing said pieces in water of from about 80° F. to about 90° F., draining the surplus water from said washed pieces, partially drying the drained pieces in vacuo while heating said pieces during said drying to a temperature exceeding normal atmospheric temperature and not exceeding about 160° F. and constantly agitating said pieces during said partial drying thereof, thoroughly mixing orange juice containing substantially the vitamin C content of the oranges with said partially dried pieces, again drying the pieces carrying said juice and vitamin C in vacuo at a temperature above that of the atmosphere and not exceeding about 160° F. while constantly agitating said pieces, until the moisture content of the pieces is less than 6% thereof by weight, and finally reducing said pieces to powder.

KITCHENER K. NEWSOM.

(References on following page)

REFERENCES CITED

The following references are of record in the file of this patent:

UNITED STATES PATENTS

| Number | Name | Date |
|---|---|---|
| 116,729 | Lowe | July 4, 1871 |
| 1,609,720 | Humphrey | Dec. 17, 1926 |
| 1,717,489 | Barlow | June 18, 1929 |
| 1,883,150 | Washburn | Oct. 18, 1932 |
| 1,977,945 | Jameson | Oct. 23, 1934 |
| 2,110,821 | Rea et al. | Mar. 8, 1938 |
| 2,192,041 | Headland | Feb. 27, 1940 |

FOREIGN PATENTS

| Number | Country | Date |
|---|---|---|
| 457,088 | Great Britain | 1936 |
| 2,456 | Australia | 1926 |